(12) United States Patent
Tzong et al.

(10) Patent No.: US 6,805,451 B1
(45) Date of Patent: Oct. 19, 2004

(54) HORIZONTAL/VERTICAL DUAL-MODE LCD PROJECTOR

(75) Inventors: Ruey-Yau Tzong, Hsinchu (TW); Chien-Chih Hsiung, Hsinchu (TW)

(73) Assignee: Cinetron Technology Inc., Hsinchu (TW)

(*) Notice: Subject to any disclaimer, the term of this patent is extended or adjusted under 35 U.S.C. 154(b) by 0 days.

(21) Appl. No.: 10/704,728

(22) Filed: Nov. 12, 2003

(51) Int. Cl.[7] .................. G03B 21/24; G03B 21/22; G03B 21/26; G03B 3/00; G02F 1/1335

(52) U.S. Cl. .................. 353/119; 353/30; 353/101; 349/5; 349/7; 349/8

(58) Field of Search .................. 353/30, 31, 71, 353/79, 100, 101, 119, 122; 349/5, 7, 8; 348/787, 788, 789

(56) References Cited

U.S. PATENT DOCUMENTS 6,508,556 B1 * 1/2003 Ueda .................. 353/74
6,601,959 B2 * 8/2003 Miyata et al. .................. 353/98

* cited by examiner

Primary Examiner—David Gray
Assistant Examiner—Melissa J Koval
(74) Attorney, Agent, or Firm—Rosenberg, Klein & Lee

(57) ABSTRACT

A horizontal/vertical dual-mode LCD projector includes a first casing having a square mounting open side, a second casing having a square mounting open side connectable to the mounting open side of the first casing between two positions at 90° angle, a lamp module mounted in the first casing, two lens arrays respectively mounted in between the mounting open side of the first casing and the lamp module, and an optical module mounted inside the second casing.

6 Claims, 7 Drawing Sheets

HORIZONTAL/VERTICAL DUAL-MODE LCD PROJECTOR

BACKGROUND OF THE INVENTION

1. Field of the Invention

The present invention relates to a LCD projector and, more particularly to a horizontal/vertical dual-mode LCD projector, which comprises a first casing holding two lens arrays and a lamp module, and a second casing holding an optical module and connectable to the first casing in such a manner that the first casing can be turned relative to the second casing through 90° angle.

2. Description of the Related Art

Conventional LCD projectors have two types, namely, the horizontal LCD projectors for use in a horizontal position and the vertical LCD projectors for use in a vertical position. These conventional LCD projectors have a limitation in use, i.e., a horizontal LCD projector cannot be used in a vertical position, and a vertical LCD projector cannot be used in a horizontal position.

FIGS. 1 and 2 show a horizontal LCD projector according to the prior art. According to this design, the horizontal LCD projector comprises an integrated housing 10a, which houses a lamp module 20a, two lens arrays 22a, and an optical module 30a. The optical module 30a comprises an optical lens set 31a, three video modulators 32a, and a projection lens 33a. The light of the lamp bulb 21a of the lamp module 20a passes through the lens arrays 22a to the optical lens set 31a and the video modulators 32a, and then the projection lens 33a projects the image of the light onto a screen or the like. The lens arrays 22a and the video modulators 32a have a respective particular length to width ratio, for example, 4:3; 16:9; 15:9. When mounting the lens arrays 22a and the video modulators 32a in the housing 10a, the lengths and widths of the video modulators 32a must be respectively corresponded to the lengths and widths the lens arrays 22a. There is also provided a cover installed in the top side of the LCD projector and a driving circuit board located on the top of the cover (not shown) for controlling the operation of the horizontal LCD projector.

The aforesaid horizontal LCD projector is still not satisfactory in function because of the following drawbacks.

1. When set the horizontal LCD projector in vertical due to a space limitation, the phase of the projected image is 90° biased from the original image phase, not suitable for viewing.
2. When set the horizontal LCD projector in vertical, the array lens 22a cannot easily be rotated through 90° to match the 90° biased video modulators 32a.
3. The video modulators 32a each have a lead wire contact 34a at one long side (see FIG. 3) or one short side (see FIG. 4). The video modulator having the lead wire contact at one long side (see FIG. 3) is suitable for use in a horizontal LCD projector because it is in proximity to the driving circuit board when installed in the housing of the horizontal LCD projector. The video modulator having the lead wire contact at one short side (see FIG. 4) is not suitable for use in a horizontal LCD projector because it is disposed at 90° angle biased from the driving circuit board when installed in the housing of the horizontal LCD projector.

Therefore, it is desirable to provide a horizontal/vertical dual-mode LCD projector that eliminates the aforesaid drawbacks.

SUMMARY OF THE INVENTION

The present invention has been accomplished under the circumstances in view. It is the main object of the present invention to provide a horizontal/vertical dual-mode LCD projector, which can be alternatively set between the horizontal operation mode and the vertical operation mode. It is the second object of the present invention to provide a horizontal/vertical dual-mode LCD projector, which has its first casing and its second casing adjustably connected together to fit the horizontal or vertical operation mode, keeping the long sides and short sides of the lens arrays in the first casing corresponded to the long sides and short sides of the video modulators of the optical module in the second casing respectively. It is the third object of the present invention to provide a horizontal/vertical dual-mode LCD projector, which fits different models of video modulators, for enabling the lead wire contacts of the loaded video modulators to be set close to the driving circuit board for quick connection.

To achieve these and other objects of the present invention, the horizontal/vertical dual-mode LCD projector comprises a first casing, the first casing having a square mounting open side; a second casing, the second casing having a square mounting open side connectable to the mounting open side of the first casing between two positions at 90° angle; a lamp module mounted in the first casing; at least one lens array respectively mounted in between the mounting open side of the first casing and the lamp module; and an optical module mounted inside the second casing.

DETAILED DESCRIPTION OF THE PREFERRED EMBODIMENT

Figure 1:
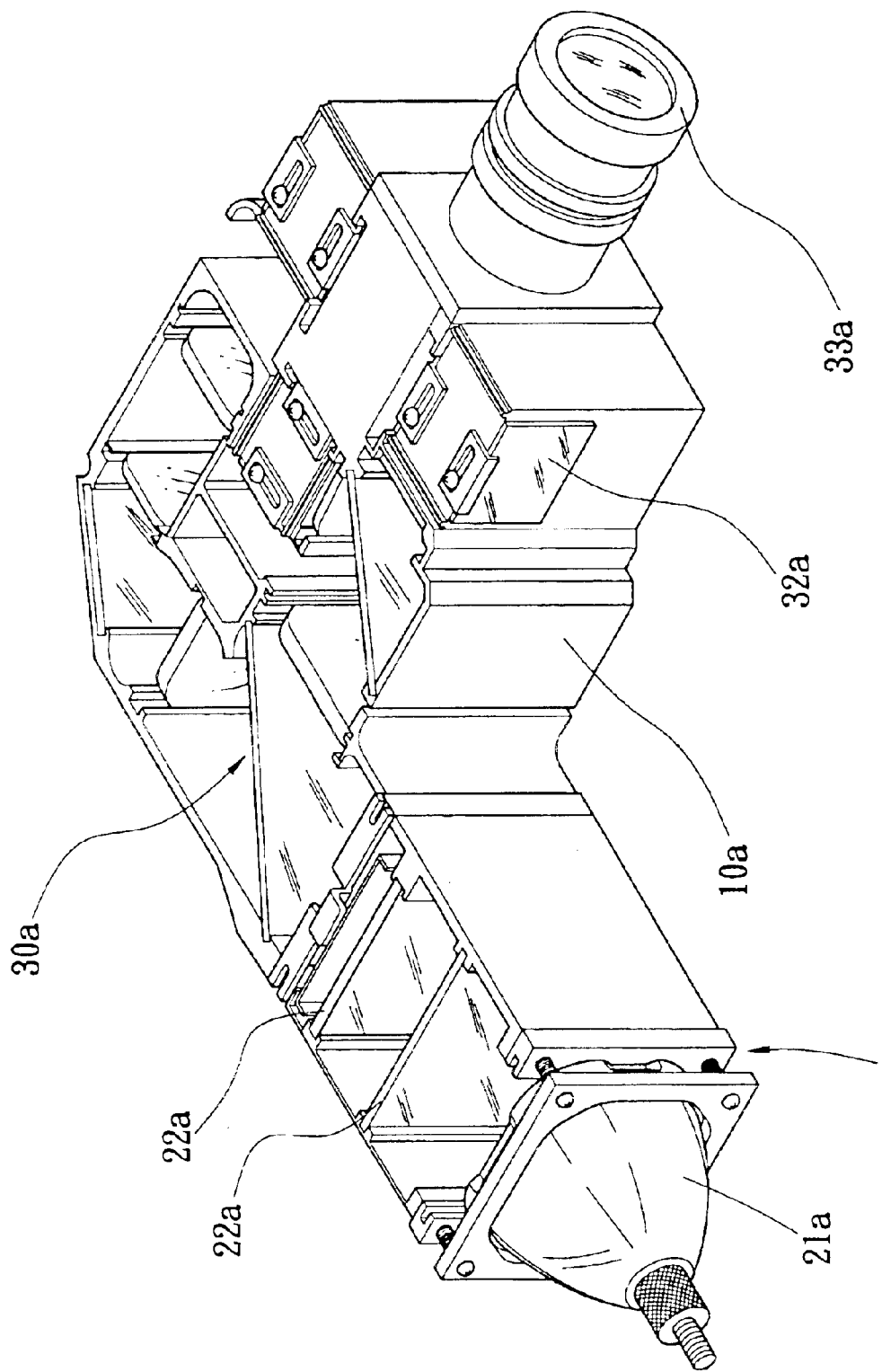
FIG. 1 is an elevational view of a horizontal LCD projector according to the prior art.
Figure 2:
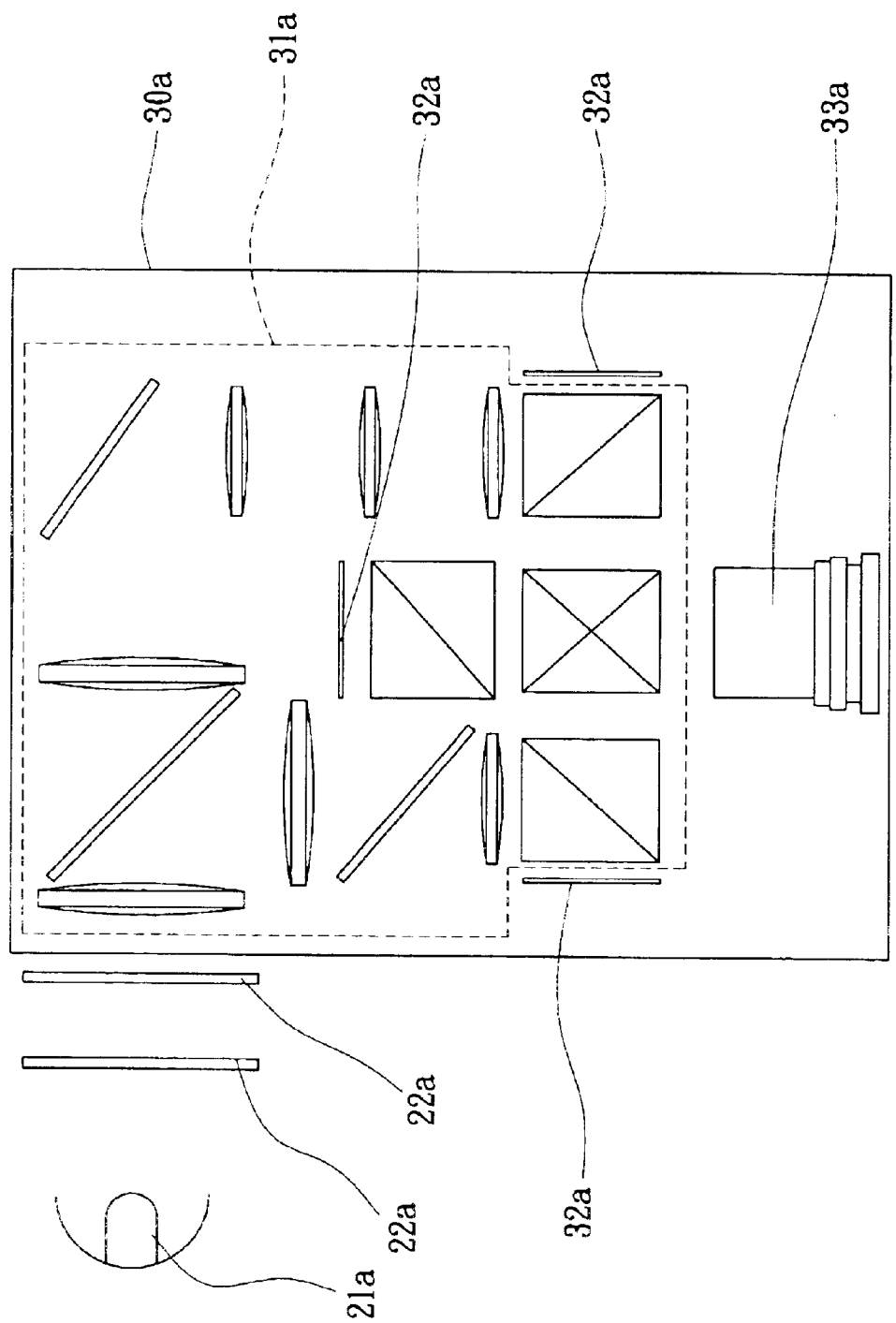
FIG. 2 is a schematic drawing showing the arrangement of the optical system of the horizontal LCD projector according to the prior art.
Figure 3:
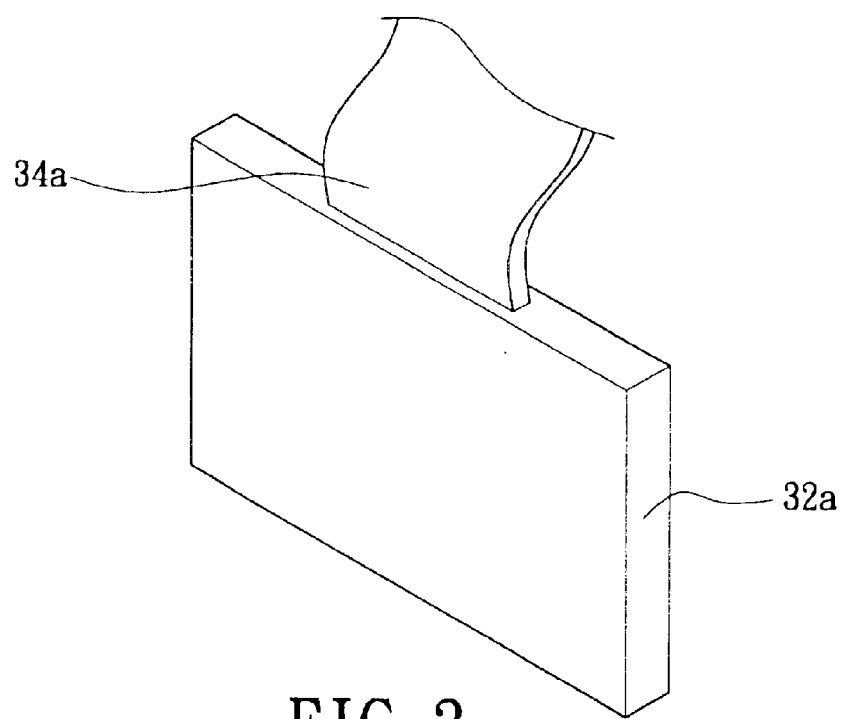
FIG. 3 is an elevational view of one image video modulator according to the prior art.
Figure 4:
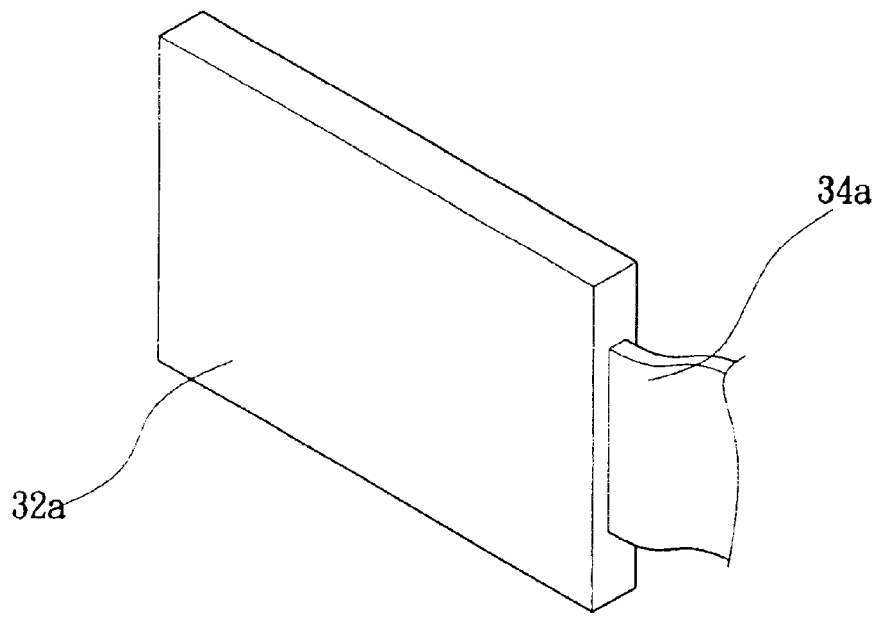
FIG. 4 is another elevational view of another image video modulator according to the prior art.
Figure 5:
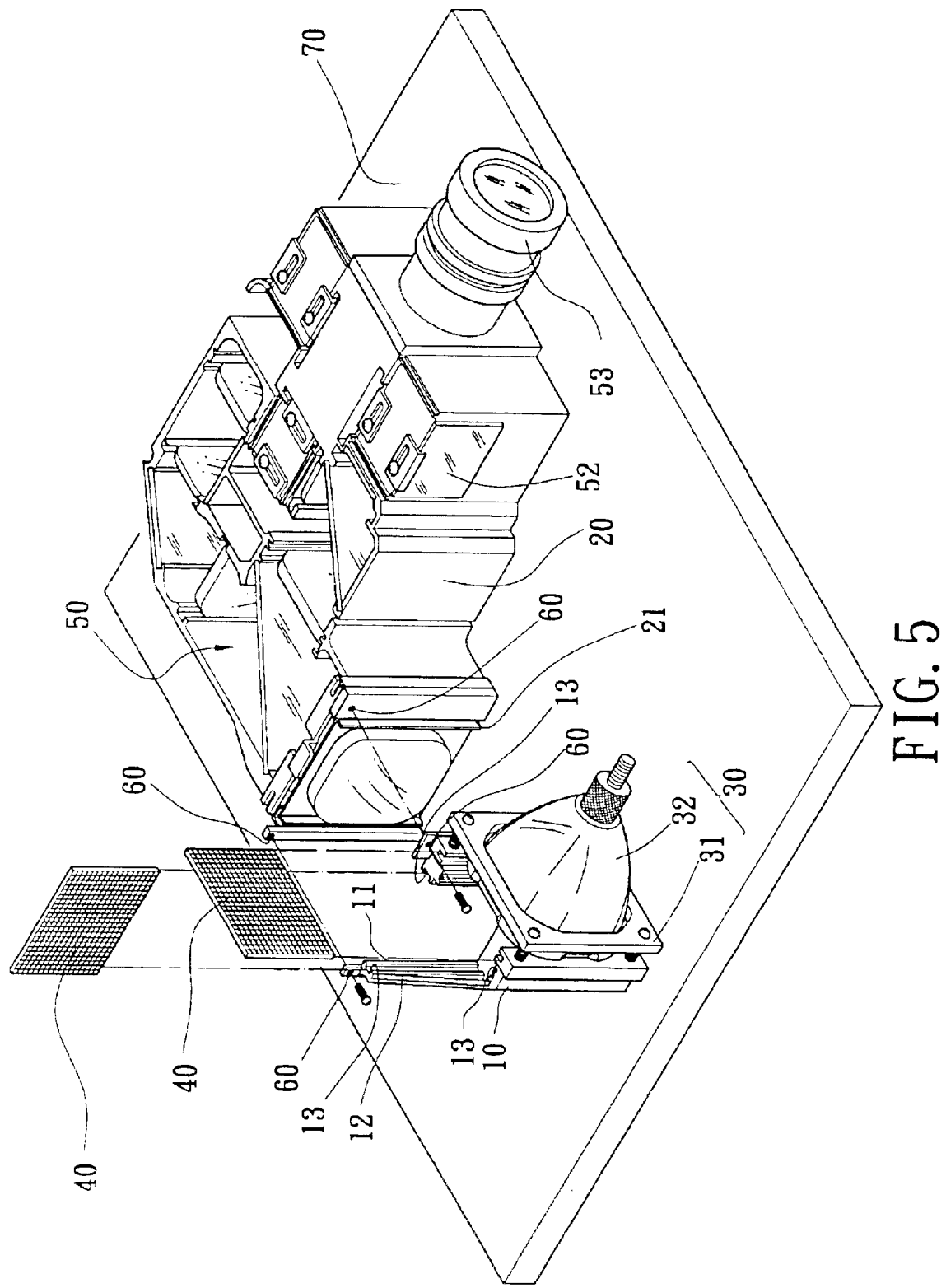
FIG. 5 is an elevational view of a horizontal/vertical dual-mode LCD projector according to the present invention.
Figure 6:
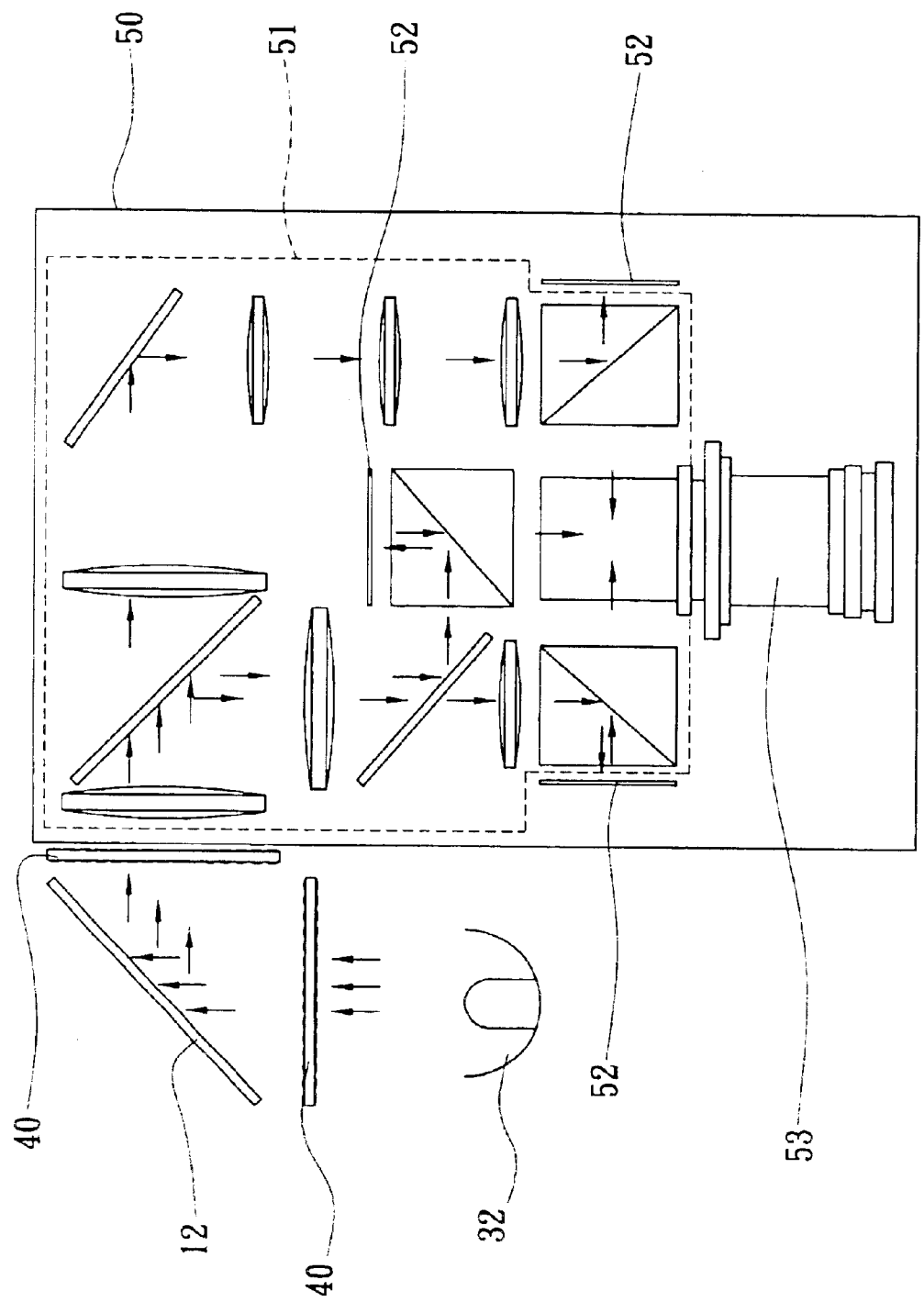
FIG. 6 is a schematic drawing showing the arrangement of the optical system of the horizontal/vertical dual-mode LCD projector according to the present invention.

Referring to FIGS. 5 and 6, a horizontal/vertical dual-mode LCD projector in accordance with the present invention is shown comprised of a first casing 10, a second casing 20, a lamp module 30, two lens arrays 40, and an optical module 50. The lamp module 30 and the lens arrays 40 are mounted inside the first casing 10. The optical module 50 is mounted inside the second casing 20. The first casing 10 and the second casing 20 are coupled together, and can be turned relative to each other subject to the vertical or horizontal operation mode of the horizontal/vertical dual-mode LCD projector selected by the user. A first cover and a second cover (not shown) are respectively covered on the first casing 10 and the second casing 20. The second cover carries a driving circuit board adapted to drive the horizontal/vertical dual-mode LCD projector.

The lamp module 30 comprises a lamp housing 31, and a lamp bulb 32 mounted in the lamp housing 31. The lamp housing 31 is installed in the first casing 10. The lens arrays 40 are set between the lamp module 30 and a mounting open side 11 of the first casing 10. A reflecting mirror 12 is set in one sidewall of the first casing 10 between the lens arrays 40. The first casing 10 has two recessed holes 13 respectively formed in two adjacent sidewalls and adapted to accommodate the two lens arrays 40. The optical module 50 comprises an optical lens set 51, three video modulators 52, and a projection lens 53. The optical module 50 is mounted inside the second casing 20. The second casing 20 has a mounting open side 21. The mounting open side 11 of the first casing 10 and the mounting open side 21 of the second casing 20 have equal length and width. The mounting open side 11 of the first casing 10 is coupled to the mounting open side 21 of the second casing 20, for enabling the light of the lamp bulb 32 to pass through one lens array 40 and then the other lens array 40 via the reflecting mirror 12, and then to pass through the optical lens set 51 and the video modulators 52 to the outside via the projection lens 53. Coupling means or fasteners 60 are provided around the mounting open side 11 of the first casing 10 and the mounting open side 21 of the econd casing 20 for fastening the mounting open side 11 of the first casing 10 to the mounting open side 21 of the second casing 20, keeping the optical axis of the lens arrays 40 coincided with the optical axis of the optical lens set 51 of the optical module 50.

Figure 7:
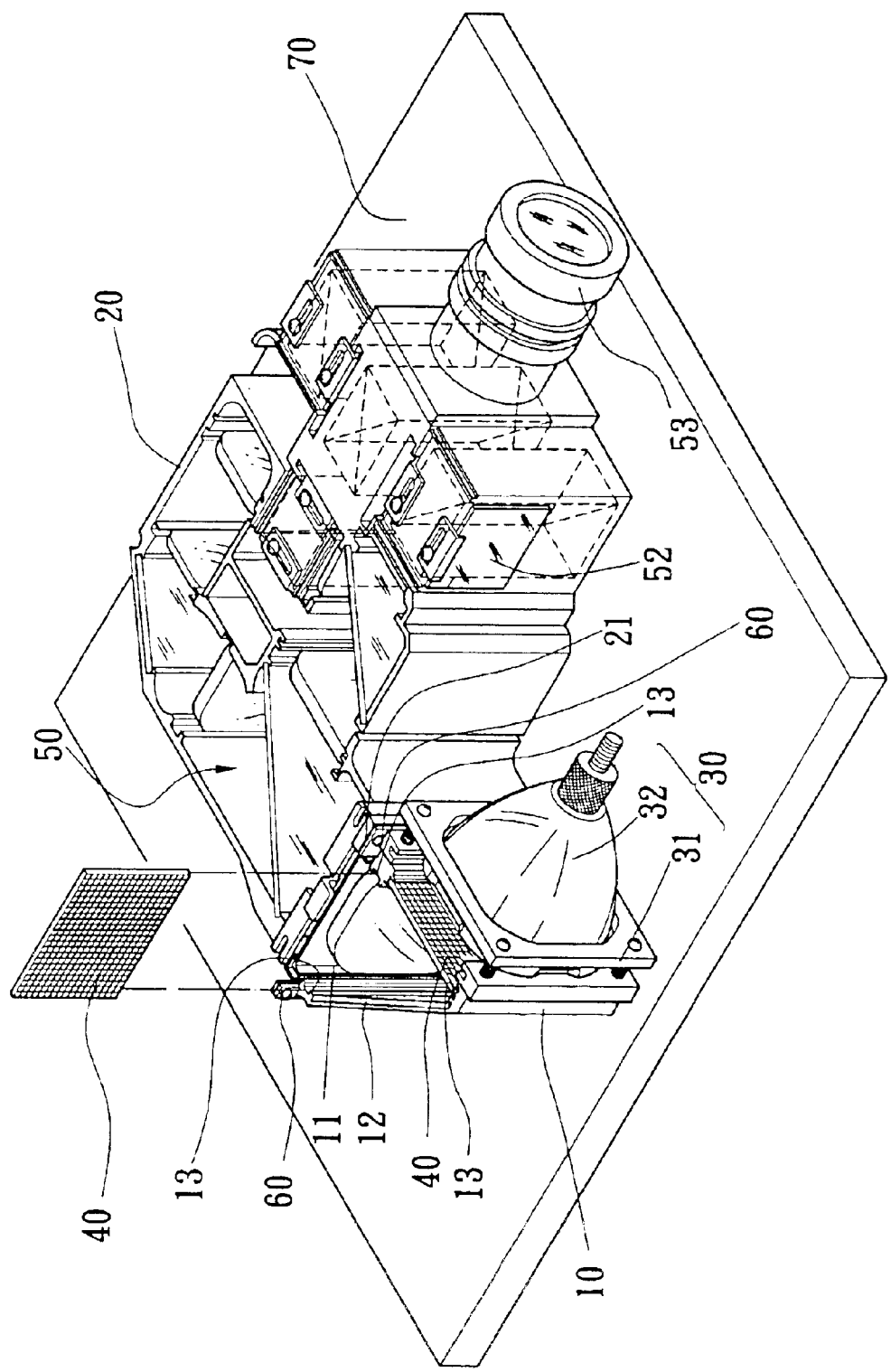
FIG. 7 is a perspective assembly view of the present invention, showing the horizontal/vertical dual-mode LCD projector set in the horizontal position.
Figure 8:
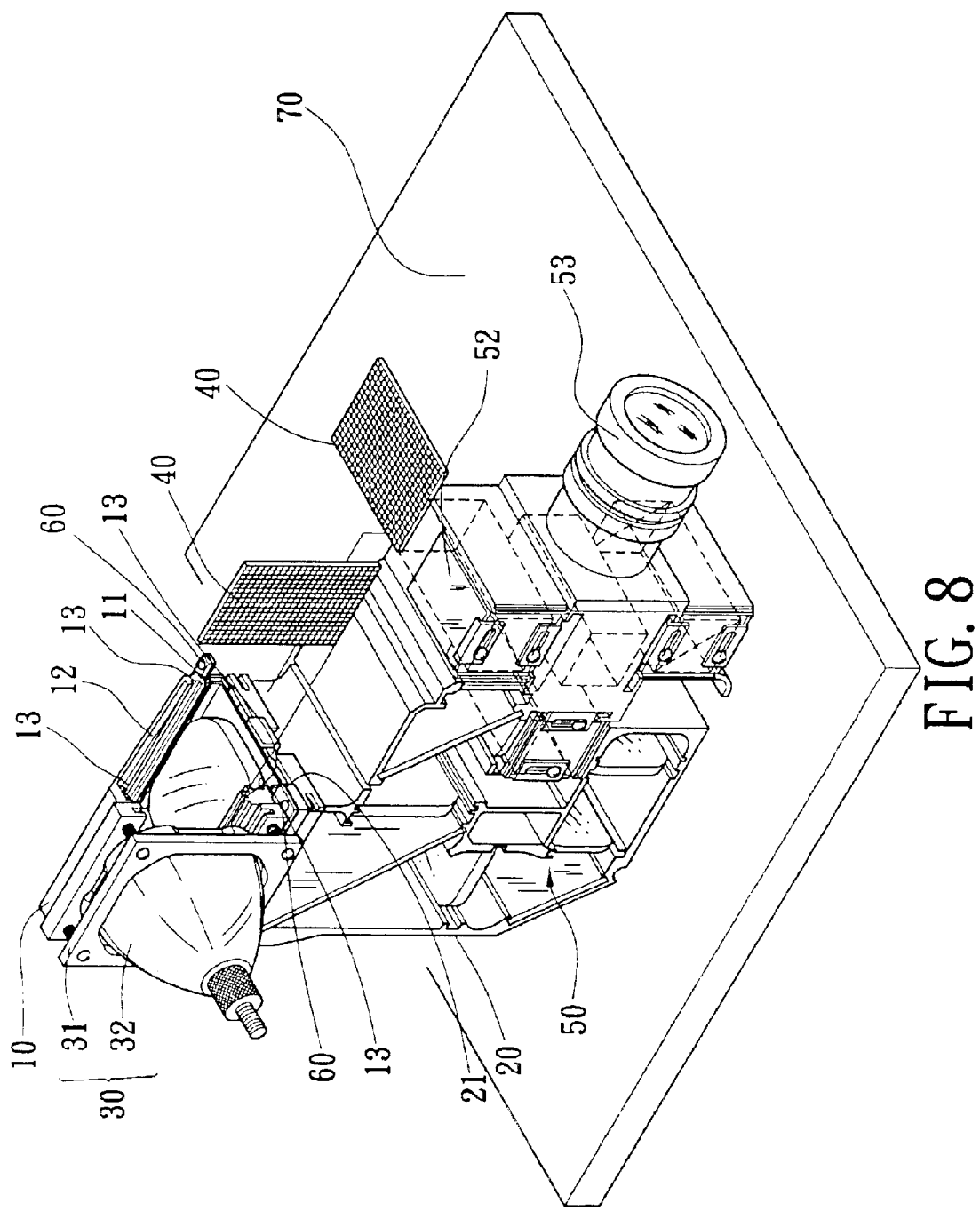
FIG. 8 is another perspective assembly view of the present invention, showing the horizontal/vertical dual-mode LCD projector set in the vertical position.

Referring to FIG. 7, when set the horizontal/vertical dual-mode LCD projector in the horizontal mode, the long sides of the lens arrays 40 in the first casing 10 as well as the long sides of the video modulators 52 are maintained in parallel to the surface of the platform 70 carrying the horizontal/vertical dual-mode LCD projector, and the long sides and short sides of the lens arrays 40 are corresponded to the long sides and short sides of the video modulators 52 respectively.

Referring to FIG. 6, when set in the horizontal/vertical dual-mode LCD projector in the vertical mode, one side of the second casing 20 is disposed in contact with the platform 70. At this time, the position of the video modulators 52 has been changed through 90°, enabling the user to view the images normally. However, the image projected from the horizontal/vertical dual-mode LCD projector at this time is still abnormal, having the center area bright and the side areas dark. Therefore, the first casing 10 must be rotated through 90° relative to the second casing 20, keeping the long sides and short sides of the lens arrays 40 in the first casing 10 respectively corresponded to the long sides and short sides of the video modulators 52 in the second casing 20. Thus, the aforesaid dark image problem is eliminated. Further, the horizontal/vertical dual-mode LCD projector may use different models of video modulators 52. When the horizontal/vertical dual-mode LCD projector adjusted to the vertical or horizontal mode, the lead wire contacts of the video modulators 52 face the driving circuit board at the cover of the second casing 20 for easy connection to the respective contacts at the driving circuit board.

If square lens arrays are used in the horizontal/vertical dual-mode LCD projector, light rays are evenly emitted through the video modulators 52 over the whole surface. The horizontal/vertical dual-mode LCD projector can be directly turned through 90° from the horizontal position to the vertical position and then place one lateral side of the second casing 20 on the platform 70 without changing the angular position of the first casing 10 relative to the second casing 20. Thus, the video modulators 52 are turned through 90°, for enabling people to view the projected images normally. Alternatively, the user can turn the video modulators 52 and the lens arrays 40 through 90° without changing the angular position of the first casing 10 relative to the second casing 20 when changing vertical/horizontal operation mode of the horizontal/vertical dual-mode LCD projector.

As indicated above, the present invention provides a orizontal/vertical dual-mode LCD projector, which enables the user to change the horizontal/vertical operation mode of the horizontal/vertical dual-mode LCD projector by means of turning the first casing through 90° relative to the second casing, keeping the long sides and short sides of the lens arrays corresponded to the long sides and short sides of the video modulators.

A prototype of horizontal/vertical dual-mode LCD projector has been constructed with the features of FIGS. 5~8. The horizontal/vertical dual-mode LCD projector functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A horizontal/vertical dual-mode LCD projector comprising:

a first casing, said first casing having a square mounting open side;

a second casing, said second casing having a square mounting open side connectable to the mounting open side of said first casing between two positions at 90° angle;

a lamp module mounted in said first casing;

at least one lens array respectively mounted in between the mounting open side of said first casing and said lamp module; and an optical module mounted inside said second casing.

2. The horizontal/vertical dual-mode LCD projector as claimed in claim 1, wherein said first casing comprises coupling means provided around the square mounting open side thereof; said second casing comprises coupling means provided around the square mounting open side thereof and connectable to the coupling means of said first casing.

3. The horizontal/vertical dual-mode LCD projector as claimed in claim 1, further comprising fastener means provided around the square mounting holes of said first casing and said second casing and adapted to selectively secure said first casing to said second casing between said two position.

4. The horizontal/vertical dual-mode LCD projector as claimed in claim 1, wherein said first casing comprises a plurality; of through holes around the square mounting open side therof; said second casing comprise a plurality of screw holes around the square mounting open side thereof for connection to the through holes of said casing by screws.

5. The horizontal/vertical dual mode LCD projector as claimed in claim 1, wherein said optical module comprises an optical lens set, said optical lens set having an optical axis coincided with the optical axis of said at least one lens array.

6. The horizontal/vertical dual mode LCD projector as claimed in claim 1, wherein said optical module comprises at least one video modulator, said at least one video modulator having long and short sides set corresponded to long and short sides of said at least one lens array respectively.

* * * * *